United States Patent
Koorapaty et al.

(10) Patent No.: US 9,544,863 B2
(45) Date of Patent: Jan. 10, 2017

(54) OVER-THE-AIR SYNCHRONIZATION FOR SMALL CELLS IN A WIRELESS COMMUNICATION NETWORK

(71) Applicant: Telefonaktiebolaget L M Ericsson (publ), Stockholm (SE)

(72) Inventors: Havish Koorapaty, Saratoga, CA (US); Daniel Larsson, Vallentuna (SE); Angelo Centonza, Winchester (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/443,898

(22) PCT Filed: Oct. 18, 2014

(86) PCT No.: PCT/SE2014/051230
§ 371 (c)(1),
(2) Date: May 19, 2015

(87) PCT Pub. No.: WO2015/057156
PCT Pub. Date: Apr. 23, 2015

(65) Prior Publication Data
US 2015/0312870 A1   Oct. 29, 2015

Related U.S. Application Data

(60) Provisional application No. 61/892,914, filed on Oct. 18, 2013.

(51) Int. Cl.
*H04W 56/00* (2009.01)
*H04W 24/10* (2009.01)

(52) U.S. Cl.
CPC ....... *H04W 56/0015* (2013.01); *H04W 56/001* (2013.01); *H04W 24/10* (2013.01)

(58) Field of Classification Search
CPC .......... H04W 56/0015; H04W 56/001; H04W 64/00; H04W 24/10; H04W 84/04; H04L 5/0048; H04L 5/0073
USPC ................... 370/328, 350; 455/456.1, 456.2
See application file for complete search history.

(56) References Cited

U.S. PATENT DOCUMENTS

| | | | |
|---|---|---|---|
| 8,447,319 B2* | 5/2013 | Carlson | G01S 5/0205 455/404.2 |
| 9,288,623 B2* | 3/2016 | Markhovsky | H04W 4/023 |
| 2010/0031012 A1* | 2/2010 | Rotondo | G06F 21/575 713/2 |
| 2010/0074180 A1* | 3/2010 | Palanki | H04W 56/0015 370/328 |
| 2010/0331013 A1* | 12/2010 | Zhang | G01S 5/0242 455/456.2 |

(Continued)

FOREIGN PATENT DOCUMENTS

EP   2 528 398 A1   11/2012

*Primary Examiner* — Afsar M Qureshi
(74) *Attorney, Agent, or Firm* — Christopher & Weisberg, P.A.

(57) ABSTRACT

A timing offset value between at least one macro node and a common global navigation satellite system, GNSS, derived reference time is measured. The timing offset value is transmitted to at least a cell node that does not have a GNSS reference for transmission timing adjusting at the cell node. In some embodiments, where no small cell in a cluster has a GNSS reference time, a timing of a macro base station is used as a reference for synchronizing small cells in the cluster.

26 Claims, 15 Drawing Sheets

(56) References Cited

U.S. PATENT DOCUMENTS

2011/0207450 A1* 8/2011 Siomina ............... G01S 5/0221
                                                      455/422.1
2013/0059592 A1   3/2013 Chakraborty et al.

* cited by examiner

OVER-THE-AIR SYNCHRONIZATION FOR SMALL CELLS IN A WIRELESS COMMUNICATION NETWORK

CROSS-REFERENCE TO RELATED APPLICATIONS

This application is a Submission Under 35 U.S.C. §371 for a U.S. National Stage Patent Application of International Application Number PCT/SE2014/051230, filed Oct. 18, 2014, entitled "OVER-THE-AIR SYNCHRONIZATION FOR SMALL CELLS IN A WIRELESS COMMUNICATION NETWORK", which claims priority to U.S. Provisional Patent Application Ser. No. 61/892,914, filed Oct. 18, 2013, entitled "OVER-THE-AIR SYNCHRONIZATION FOR SMALL CELLS IN A WIRELESS COMMUNICATION NETWORK," the entirety of both of which are incorporated herein by reference.

TECHNICAL FIELD

This written description relates to wireless communications, and in particular to a method and apparatus for coordinating macro cells that are used for synchronization within a small cell cluster having several small cells.

BACKGROUND

Third Generation Partnership Project (3GPP) Long Term Evolution (LTE) technology is a mobile broadband wireless communication technology in which transmissions from base stations (referred to as eNBs or as cell nodes) to mobile stations (referred to as user equipment (UE)) are sent using orthogonal frequency division multiplexing (OFDM). OFDM splits the signal into multiple parallel subcarriers in frequency. The basic unit of transmission in LTE is a resource block (RB) which, in its most common configuration, consists of twelve subcarriers and seven OFDM symbols (one slot). A unit of one subcarrier and one OFDM symbol is referred to as a resource element (RE) 1, as shown in FIG. 1. Thus, an RB consists of eighty-four REs. An LTE radio subframe 2 is composed of two slots in time and multiple resource blocks in frequency with the number of RBs determining the bandwidth of the system, as shown in FIG. 2. Furthermore, the two RBs in a subframe that are adjacent in time are denoted as an RB pair. Currently, LTE supports standard bandwidth sizes of 6, 15, 25, 50, 75 and 100 RB pairs.

In the time domain, LTE downlink transmissions are organized into radio frames of 10 ms, each radio frame consisting of ten equally-sized subframes of length $T_{subframe}=1$ ms.

The signal transmitted by the eNB in a downlink (the link carrying transmissions from the eNB to the UE) subframe may be transmitted from multiple antennas and the signal may be received at a UE that has multiple antennas. The radio channel distorts the transmitted signals from the multiple antenna ports. In order to demodulate any transmissions on the downlink, a UE relies on reference symbols (RS) that are transmitted on the downlink. These reference symbols and their position in the time-frequency grid are known to the UE and hence, can be used to determine channel estimates by measuring the effect of the radio channel on these symbols. In Rel-11 and prior releases of LTE, there are multiple types of reference symbols. The common reference symbols (CRS) are used for channel estimation during demodulation of control and data messages in addition to synchronization. The CRS occur once every subframe.

Heterogeneous networks, where the macro cells and the small cells have vastly different transmit powers, may be deployed in two main ways. In the first deployment type, the small cell layer and the macro cell layer share the same carrier frequencies which creates interference between the two layers. In the second deployment type, the small cell layer and macro cell layer are on separate frequencies. The network architecture for LTE allows messages to be sent between eNBs via an X2 interface. The eNB also can communicate with other nodes in the network, e.g., to the Mobility Management Entity (MME) via the S1 interface.

The existing specifications for home eNBs (HeNBs) allow some self-organizing network (SON) functionality, where an eNB can request information regarding another eNB via the MME. In FIG. 3, the architecture 3, involving evolved universal terrestrial access network (E-UTRAN), the radio access network (RAN) and the core network (CN) is shown. According to current specifications it is possible for an eNB 4 to request SON information via an S1 procedure called eNB Configuration Transfer. Within a CONFIGURATION TRANSFER message from the eNB 4 to the MME 6, it is possible to indicate a target eNB identification (ID) and the SON information that are required from that target eNB 8. The MME 6 will forward such an information request to the target eNB 8 via a procedure called MME Configuration Transfer. Once the target eNB 8 receives the request it will reply via the eNB Configuration Transfer procedure towards the MME 6. The reply will include the information requested by the source eNB 4. The MME 6 will forward the information requested to the source eNB by means of a new MME Information Transfer.

If a source eNB 4 requests time synchronization information from a target eNB 8, the reply contained in the SON Configuration Transfer IE from target eNB 8 to source eNB 4 should include the following elements:

1) Stratum level: This is the number of hops between the eNB and the synchronization source. That is, when the stratum level is M, the eNB is synchronized to an eNB whose stratum level is M−1, which in turn is synchronized to an eNB with stratum level M−2 and so on. The eNB with stratum level 0 is the synchronization source.

2) Synchronization status: This is a flag that indicates whether an eNB is currently in a synchronous or asynchronous state.

Many features of 3GPP Long Term Evolution (LTE) technology benefit from the base stations (referred to as eNBs) in the system being synchronized with each other with respect to transmit timing and frequency. Synchronization of eNBs is typically done using a global navigation satellite system (GNSS) such as the Global Positioning System (GPS) or by using network based methods such as IEEE 1588v2. However, when such methods are unavailable to an eNB, it may be possible to use LTE reference signals transmitted by other eNBs to acquire synchronization. Such techniques have been discussed in 3GPP for small cells in LTE Rel-12 where a small cell can obtain synchronization from a macro cell or from other small cells.

One of the scenarios being considered is the case where the macro cell layer is not synchronized, i.e., the timing of the macro cells is not aligned, whereas the small cell layer in the coverage of the macro layer is desired to be synchronized. When small cells in a cluster of cells that are on the border of two macro cells use a macro eNB to obtain synchronization, it may be possible that the small cells in the cluster synchronize to different macro eNBs. When this happens, small cells in the same cluster may not be time-synchronized with each other since the different macro eNBs that were used as the synchronization source are not synchronized between themselves.

One of the existing solutions to this problem is to limit the number of small cells in a cluster that can synchronize to a macro cell to one and then to let all the other small cells synchronize to this master cell either directly or via other small cells that have synchronized to this master cell. This can ensure that cells in the small cell cluster do not synchronize to different macro cells. However, the problem with this solution is that an eNB may be separated in the synchronization hierarchy from the master eNB in the cluster by many hops. For example, an eNB may synchronize to another eNB which has in turn synchronized to another eNB which has synchronized to the master eNB. The number of hops in this case is three. When the number of hops increases, the estimation errors in each hop may accumulate so that the synchronization accuracy for the eNB with a high hop number may be compromised.

Another solution is to ensure that every eNB has a GNSS receiver and/or is connected to a backhaul that can support network based synchronization. This solution can, however, lead to greater cost and also may not be feasible in some cases where satellite coverage or a good backhaul connection is not possible.

SUMMARY

The present disclosure advantageously provides a method and system for synchronizing a plurality of nodes in a wireless communication system. According to one aspect, a method includes receiving a first measured timing offset value between a first node of a first type and a common global navigation satellite system, GNSS, reference time received from a first node of a second type having the GNSS reference time. The method also includes determining a timing offset value based on the first measured timing offset value. The method further includes transmitting the determined timing offset value to a second node of the second type that does not have a GNSS reference time so that the second node of the second type is enabled to synchronize to timing of the first node of the first type.

According to this aspect, in some embodiments, the first node of the first type is a macro cell node and the first and second nodes of the second type are small cell nodes. In some embodiments, the first timing offset value is relayed from a network node to a plurality of small cell nodes not having a GNSS reference time, so that the plurality of small cell nodes are enabled to synchronize to timing of the first macro cell node. In some embodiments, the method further includes averaging measured timing offset values between the first macro cell node and each of a plurality of small cell nodes to produce the determined timing offset value. In some embodiments, the method further includes receiving from a second small cell node a request for timing assistance information. In some embodiments, the request for timing assistance information is contained in a self-organizing network, SON, information element. In these embodiments, the method further includes generating a response to the request for timing assistance information and embedding the response in a SON information element. In some embodiments, the method further includes sending a stratum level and synchronization status of other small cell nodes in a cluster containing the first small cell node. In some embodiments, the method includes measuring a second timing offset between a second macro cell node and the GNSS reference time to enable synchronization of the second macro cell node with the first macro cell node.

According to another aspect, some embodiments provide a method for synchronizing a plurality of nodes of a second type in the absence of the plurality of nodes of the second type having a global navigation satellite system, GNSS, reference. The method includes receiving from a first node of the second type a first measured timing offset value between a first node of a first type and the first node of the second type. The method includes determining a timing offset value based on the first measured timing offset value; and transmitting the timing offset value to the plurality of nodes of the second type.

According to this aspect, in some embodiments, the method further includes receiving from a second node of the second type a second measured timing offset value between the first node of the first type and the second node of the second type, and further includes averaging the first measured timing offset and the second measured timing offset value to determine the transmitted timing offset value. In some embodiments, the method further includes transmitting the timing offset value to a second node of the first type to enable the second node of the first type to synchronize with the first node of the first type.

According to another aspect, some embodiments provide a network node configured to synchronize a plurality of nodes of a second type to the timing of a node of a first type. The network node includes a memory configured to store a first measured timing offset value between a first node of the first type and a global navigation satellite system, GNSS, reference time received from a first node of the second type having the GNSS reference time. The memory is also configured to store a timing offset value based on the first measured timing offset value. The network node also includes a processor configured to determining the timing offset value. The network node also includes a transceiver configured to receive the first measured timing offset value. The transceiver is also configured to transmit the determined timing offset value to a second node of the second type lacking a GNSS reference time to enable the second node of the second type to synchronize to the first node of the first type.

According to this aspect, in some embodiments, the network node is a node of the first type. In some embodiments, the first node of the first type is a macro cell node, the first node of the second type is a small cell node having the GNSS reference time, and the second node of the second type is a small cell node not having the GNSS reference time. In some embodiments, the transceiver is further configured to receive a plurality of measured timing offset values from a plurality of small cell nodes, and to transmit an average of the measured timing offset values. In these embodiments, the processor is further configured to compute the average of the measured timing offset values.

According to another aspect, some embodiments provide a network node configured to synchronize a plurality of nodes of a second type, the plurality of nodes of the second type lacking a common global navigation satellite system, GNSS, reference. The network node includes a transceiver configured to receive from a first node of the second type a first measured timing offset value between a first node of a first type and the first node of the second type; and transmit a timing offset value to the plurality of nodes of the second type, the timing offset value being determined based on the first measured timing offset value. The network node further includes a processor configured to determine the timing offset value. Also, the network node includes a memory configured to store the first measured timing offset value; and the timing offset value.

According to this aspect, in some embodiments, the processor is configured to determine the timing offset value based on a difference between a timing of the first node of the first type and a second node of the first type. In some embodiments, the processor is further configured to compute an average of a plurality of received measured time offset values from a plurality of nodes of the second type. In some embodiments, the processor is further configured to select at least one of a node of the second type and a node of the first type to include in a group of nodes to synchronize with the first node of the first type.

According to another aspect, some embodiments provide a node of a second type having a global navigation satellite system, GNSS, reference, the node of the second type being in a cluster of nodes of the second type within a coverage area of at least one node of a first type. The node of the second type includes a memory configured to store a GNSS reference time; and a measured timing offset value between a timing of the node of the first type and the GNSS reference time. The node of the second type also includes a processor configured to determine the measured timing offset value. The small cell node also includes a transceiver configured to receive the timing node of the first type; and transmit the measured timing offset value to a network node.

According to this aspect, in some embodiments, the transceiver is further configured to transmit an identity of the node of the first type. In some embodiments, the transceiver is further configured to transmit the measured timing offset value to another node of the second type. In some embodiments, the node of the second type operates at frequencies different from frequencies of operation of the node of the first type.

According to another aspect, some embodiments provide a network node that includes a memory module, a processor module and a transceiver module. The memory module is configured to store: a measured timing offset value; and a determined timing offset value. The processor module includes a timing offset value determination module configured to determine the determined timing offset value based on the measured timing offset value. The transceiver module is configured to receive the measured timing offset value; and transmit the timing offset value to a plurality of nodes of another type.

According to another aspect, some embodiments provide a node. The node includes a memory module configured to store a measured timing offset value and a global navigation satellite system, GNSS, reference time. The node also includes a processor module that includes a timing offset value measurement module configured to measure a timing offset value between the GNSS reference time and a time of a node of another type. The processor module also includes a GNSS reference time generator configured to generate the GNSS reference time. The node also includes a transceiver module configured to receive the time of the node of the other type and transmit the measured timing offset value to a network node.

BRIEF DESCRIPTION OF THE DRAWINGS

A more complete understanding of the present disclosure, and the attendant advantages and features thereof, will be more readily understood by reference to the following detailed description when considered in conjunction with the accompanying

DETAILED DESCRIPTION

Figure 1:
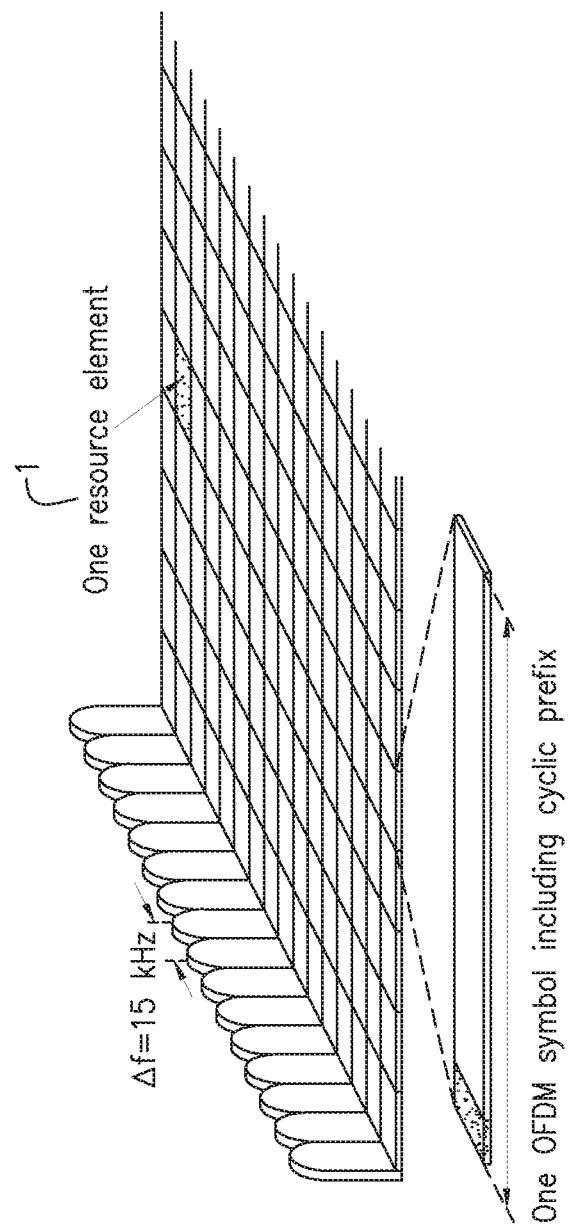
FIG. 1 is a diagram of a downlink physical resource in accordance with LTE standards.
Figure 2:
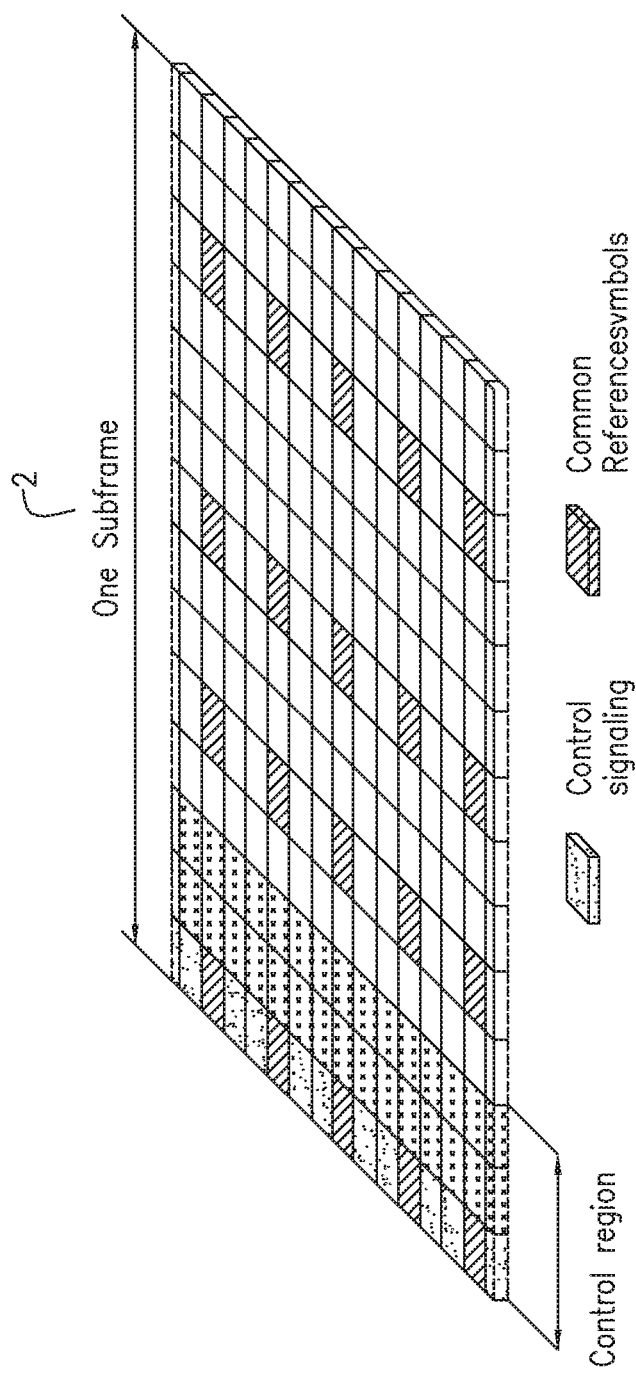
FIG. 2 is a diagram of a downlink subframe in accordance with LTE standards.
Figure 3:
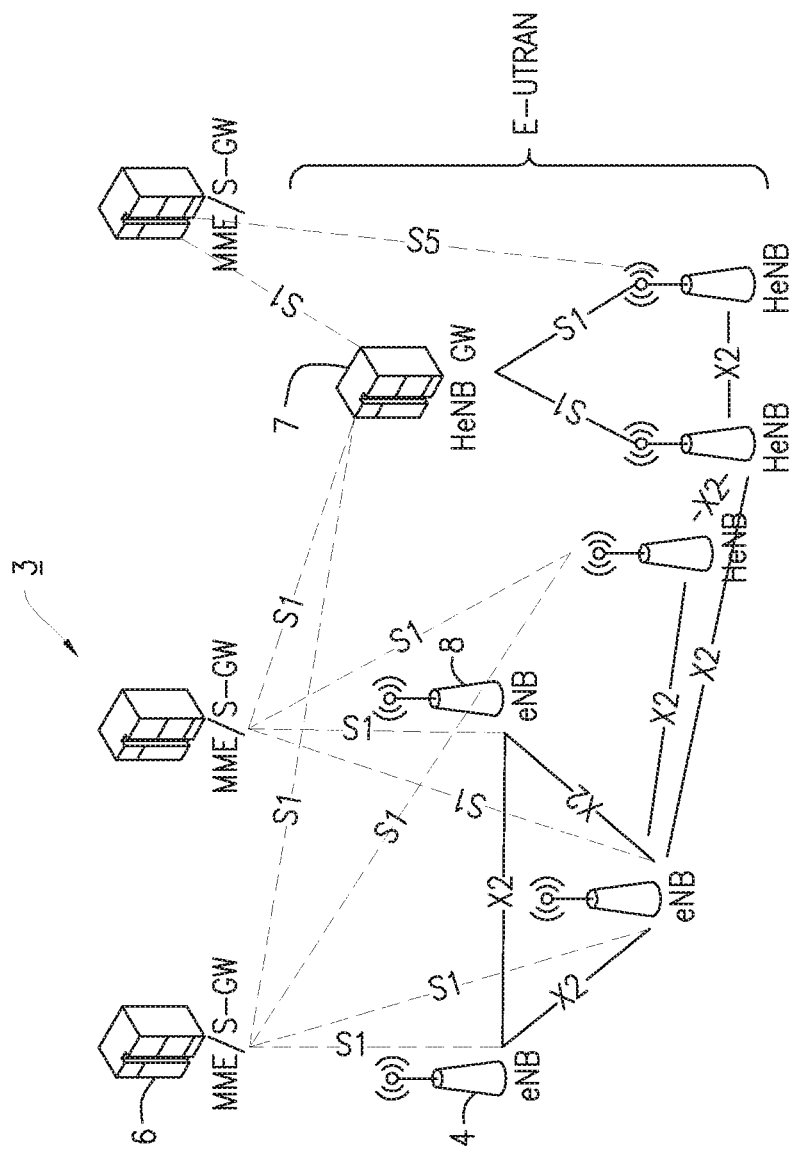
FIG. 3 is a diagram of a LTE architecture in accordance with LTE standards.

The present disclosure advantageously provides an apparatus, system and method for coordinating the macro cells that are used for eNB synchronization within a small cell cluster. Specifically, the small cells within a cluster are coordinated so that they all synchronize to the same macro cell or when they synchronize to different macro cells, their offsets with respect to a common time reference are known. This ensures that all small cells maintain synchronization with each other. Several embodiments for achieving such coordination are described. Included are embodiments where no small cell has access to a GNSS based time reference such as GPS. Also included are embodiments where at least one small cell in a cluster of small cells has access to such a reference. The coordination described herein ensures that all of a group of small cells maintain synchronization with each other. As used herein, a macro cell eNB is also referred to as a macro cell node, and a small cell eNB is also referred to as a small cell node. In addition, the terms "cell node" and "eNB" may be used interchangeably. Note also that the terms "macro cell node" and "small cell node" refer to nodes in a specific embodiment, e.g., long term evolution (LTE) wireless communication system, described herein. The disclosure is not limited solely to such a system or the specific embodiments described herein. Thus, in some embodiments, the macro cell may be substituted with a node of a first type, and the small cell node may be substituted with a node of second type in which the first type and the second type nodes perform the functions described herein.

The system, device and method components are represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description.

Some embodiments may be classified into two categories. In the first category, at least one small cell node in a cluster of cell nodes that are close to each other has the capability to receive GNSS signals. In the second category, no small cell node in the cluster has such a capability.

First, embodiments where at least one small cell in a cluster has a GNSS reference are considered. A small cell node may not have a GNSS reference for two reasons. The first is that it does not have a GNSS receiver. The second is that it may not be situated in a location where it has adequate coverage to the GNSS satellites. Embodiments where both of these limitations are overcome for at least one small cell node in a cluster are considered first. A cluster is defined as a set of small cell nodes which are close to each other so that they may interfere with each other.

Synchronization among the small cell nodes in a cluster is beneficial in this case.

Figure 4:
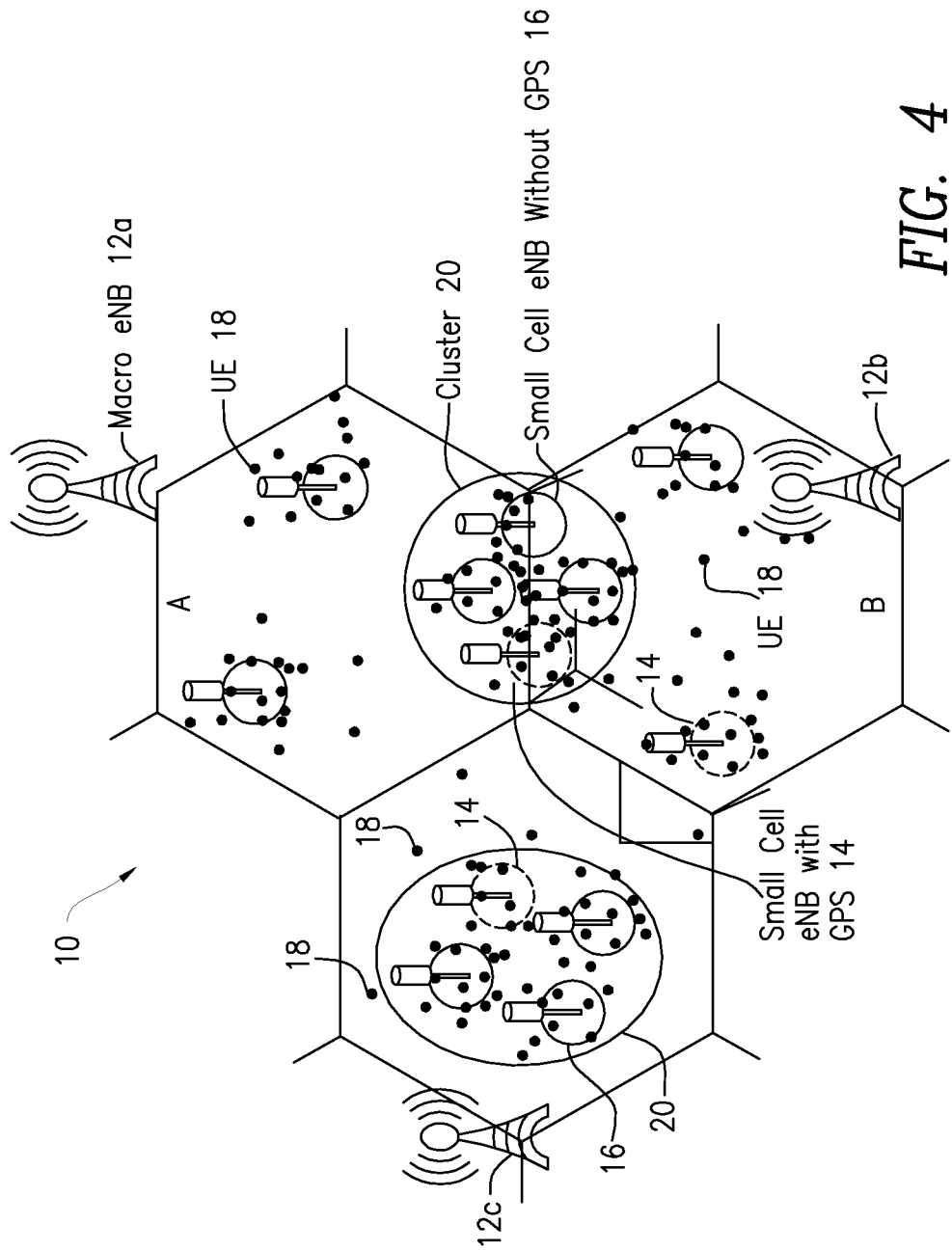
FIG. 4 is a diagram of a system for performing coordination of macro cells and small cells within a cluster in accordance with the principles of the present disclosure.

FIG. 4 illustrates a heterogeneous network 10 serving multiple user equipment (UE) 18, where at least one small cell node 14 in a cluster of cells 20 with more than one small cell has GNSS capability, and at least one small cell node 16 in the cluster 20 does not have GNSS capability. Each cell may be served by a macro cell node 12a, 12b or 12c, referred to herein collectively as macro cell nodes 12. Note that although three macro cells are shown in FIG. 4, embodiments are not limited to three macro cells. Similarly, although FIG. 4 shows various quantities of other elements, these quantities are shown for convenience. It is understood that embodiments are not limited to the exact quantities of elements shown in FIG. 4.

As shown in FIG. 4, a cluster 20 may be on the border of a coverage area for two different macro cells A and B, served by macro cell nodes 12a and 12b. When this occurs, different small cell nodes 14 and 16 in the cluster 20 may prefer to use different macro cells for synchronization based on the received signal strength from the macro cells. If the macro cells are not synchronized, then the different cell nodes 14 and 16 may not be synchronized with each other. For the case where the cluster of small cells is on a different frequency than the macro cells in the neighborhood, a priority may be to allow the whole cluster to synchronize to a common time reference, but not necessarily to have the whole cluster synchronized with any specific macro cell signal. This is because macro cell nodes 12 and small cell nodes 14 and 16 do not interfere with each other when the macro cell nodes 12 and the cluster of cells of cell nodes 14, 16 do not use the same frequencies.

On the contrary, if macro cell nodes 12 and small cell nodes 14, 16 are deployed on the same frequency, the two cell layers will interfere with each other. In this case it may be desirable if the whole cluster synchronizes to one macro cell. The latter would at least provide better interference mitigation between the cluster of small cells and one macro cell.

A First Embodiment

Figure 5:
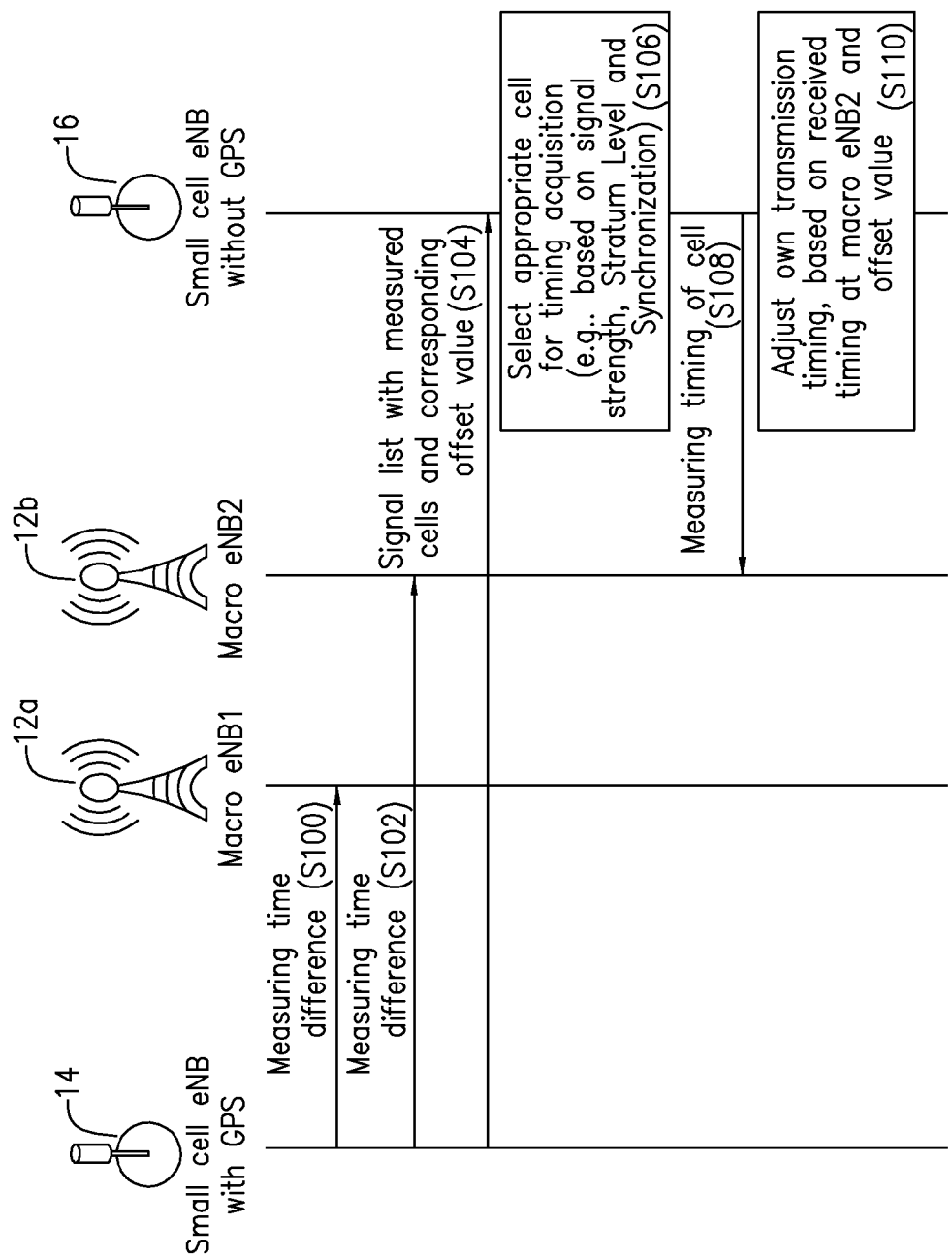
FIG. 5 is a signaling flow diagram of a distributed version of a system for achieving synchronization of multiple cell nodes in accordance with the principles of the present disclosure.

FIG. 5 is a signaling flow diagram for an embodiment where at least one small cell node (eNB) 14 in the cluster 20 has GNSS reference capability. In such embodiments, the small cell node 14 measures the timing offset between each detectable macro cell node 12a, 12b reference time and a GNSS-derived reference time determined at the small cell node 14 (blocks S100 and S102). This offset is propagated to other small cell nodes 16 and macro cell nodes 12 which can use the information to align their transmissions to the common GNSS reference time of the small cell node 14, even though they may listen to different macro cells in the set of macro cells for which offsets are available (block S104).

The reference time may be agreed to a priori or can be signalled in messages used for propagating the offsets. As mentioned above, synchronization of the whole cluster to the GNSS source may be more suitable for a scenario where small cells and macro cells are on different frequency layers. However, in cases of same-frequency deployments, other methods described below can be used, where synchronization of the whole cluster towards one macro cell might be facilitated.

As an illustrative example, a small cell node 14 with a GNSS reference may measure a time difference of $\delta_i$ between the received frame timing of an eNB i (for example a macro cell node 12) and a GNSS reference time determined at the small cell node 14. That is, $$\delta_i = t_i^g - t_R, \forall i \in \{1, 2, \ldots\}$$

where $t_i^g$ is the received timing for the $i^{th}$ macro cell node 12 at the small cell node 14 with GNSS reference, and $t_R$ is the reference timing derived from GNSS. These time differences are then made available to another small cell node 16 that does not have a GNSS reference but is able to receive signals from some cell nodes 12, 14. This small cell node 16, e.g., eNB n, then measures the receive frame timing of one of the cell nodes, say eNB k (for example, another macro cell node 12), and uses the measured receive frame timing to align the transmit timing of small cell node n, 16 (block S106).

Specifically, the small cell node n 16 may measure receive timing of macro cell node k 12 represented by $t_k^n$ (block S108). Knowledge of the timing offset, $\delta_k$, for macro cell node k 12, communicated by the small cell node 14 with a GPS receiver, is used to align the transmit timing for the small cell small cell node n 16, as follows.

$$t_T^n = t_k^n - \delta_k,$$

where $t_T^n \approx t_R$ is the transmit timing that should be used by the nth small cell node 16 (block S110).

It should be noted that the propagation delay differences for the links between two small cells and a macro cell are ignored since they are assumed to be very small. It should also be noted that the common synchronization reference timing achieved for the small cell using the above method may be different from that of any macro cell. This may be acceptable when the macro cells and small cells are on separate frequencies. When the macro cells are on the same frequency, the reference time $t_R$ may be chosen to align with one of the macro cells.

The above procedure can also be used to align transmissions on a radio-frame level so that the beginning of radio frames are aligned across different cells. It is possible that the radio frame number for the radio frames being transmitted by different cells may not be aligned between the different cells. Correspondingly, the frame number offset can be signaled between macro cell node k 12 and small cell node n, 16. The nth small cell node 16 would then, together with aligning its transmission timing according to the method described above, further align the frame number according to the signaled value. If the value is not signaled, eNB n may assume the same frame number as eNB k.

The methods by which the time differences measured at the small cell node 14 are distributed to the other cell nodes (eNBs) may be divided into two categories. The first category of methods uses distributed coordination, as shown in FIG. 5, where the eNBs communicate with each other and propagate the time offset information. The second category of methods uses centralized coordination where a network node 22 coordinates and directs eNBs regarding corresponding offsets that should be used for synchronization, as shown in FIG. 6.

In an embodiment that uses distributed coordination, the eNBs may exchange offset information with respect to a common GNSS reference among themselves. This is in addition to the stratum level and synchronization status elements that are already exchanged as part of the self-organizing networks (SON) functionality for Home eNodeBs (HeNBs).

A Second Embodiment

Figure 6:
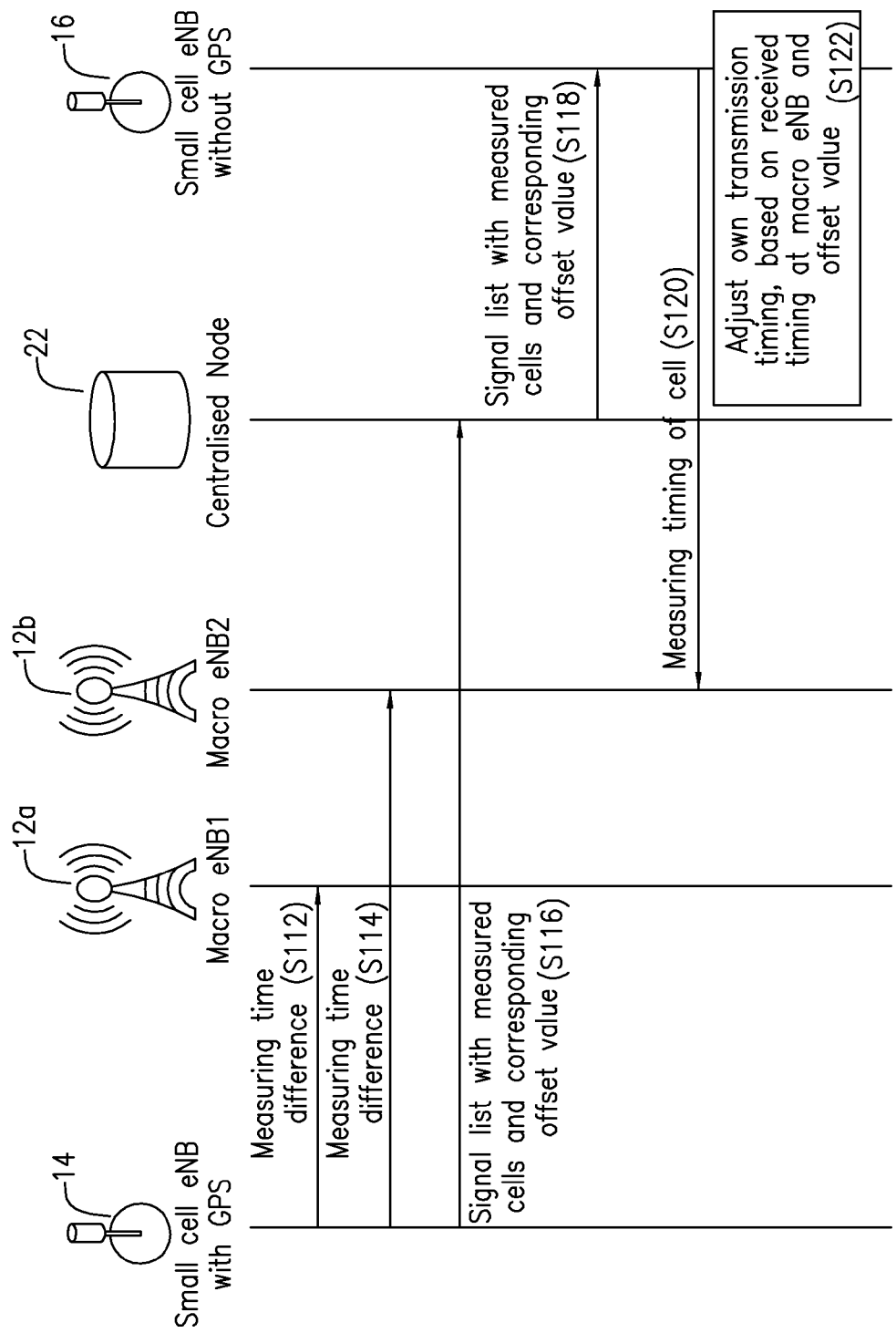
FIG. 6 is a signaling flow diagram for an embodiment having a central node, in accordance with the principles of the present disclosure.

Referring to FIG. 6, in some embodiments, the small cell node 14 that has access to a GNSS reference may monitor the time offsets of other macro cell nodes 12a, 12b with respect to the GNSS reference (blocks S112, S114). The small cell node 14 having GNSS capability, referred to henceforth as a reference eNB or as a reference small cell node, sends a message to a centralized node 22. The message includes a list of each measured macro cell node 12 and the corresponding timing offset value. Thus, according to some embodiments, a signalling message from a small cell node 14 to other cell nodes 12, 16 is defined and which contains the following information elements:

1) a list of cell IDs;
2) a corresponding list of time offsets between frame timing and GNSS reference for each cell ID;
3) if known, the Stratum Level and Synchronization Status of each cell. The latter information might have been previously received by means of S1 signalling or by means of configuration; and
4) optionally the Radio Frame Number of each cell reported.

The message may be sent to the centralized node 22 (block S116). The message may be sent via the network node 22 to the small cell node 16 (block S118). The centralized node 22 may be, for example, the MME 6 or the HeNB GW 7 on the S1 interface, the OAM system, or a dedicated centralized node. The information in the message may alternatively be sent directly between eNBs using, for example, the X2 interface between eNBs. The message may also be transmitted wirelessly by the reference small cell node 14. In case of wireless transmission, the above message may be transmitted in one of the system information blocks of the physical broadcast channel (PBCH), or on a specific downlink channel dedicated for wireless synchronization of eNBs.

The small cell nodes 16 that receive this information and want to be synchronized with other small cell nodes use this information to adjust their transmit timing to align with other macro cell nodes 12 (block S122). If a cell node 12 or 16 receives this information and does not need to be synchronized or needs to wait for some time before making a change to its transmit timing, the cell node 12 or 16 records the offset between its timing and the GNSS reference. This is true for both macro and small cell nodes that receive this offset information. When a macro cell node 12 or centralized node 22 receives offset information from multiple reference small cell nodes 14, the offsets are averaged to obtain a mean offset value for the transmission frame timing of cell nodes 12, 16.

A Third Embodiment

Figure 7:
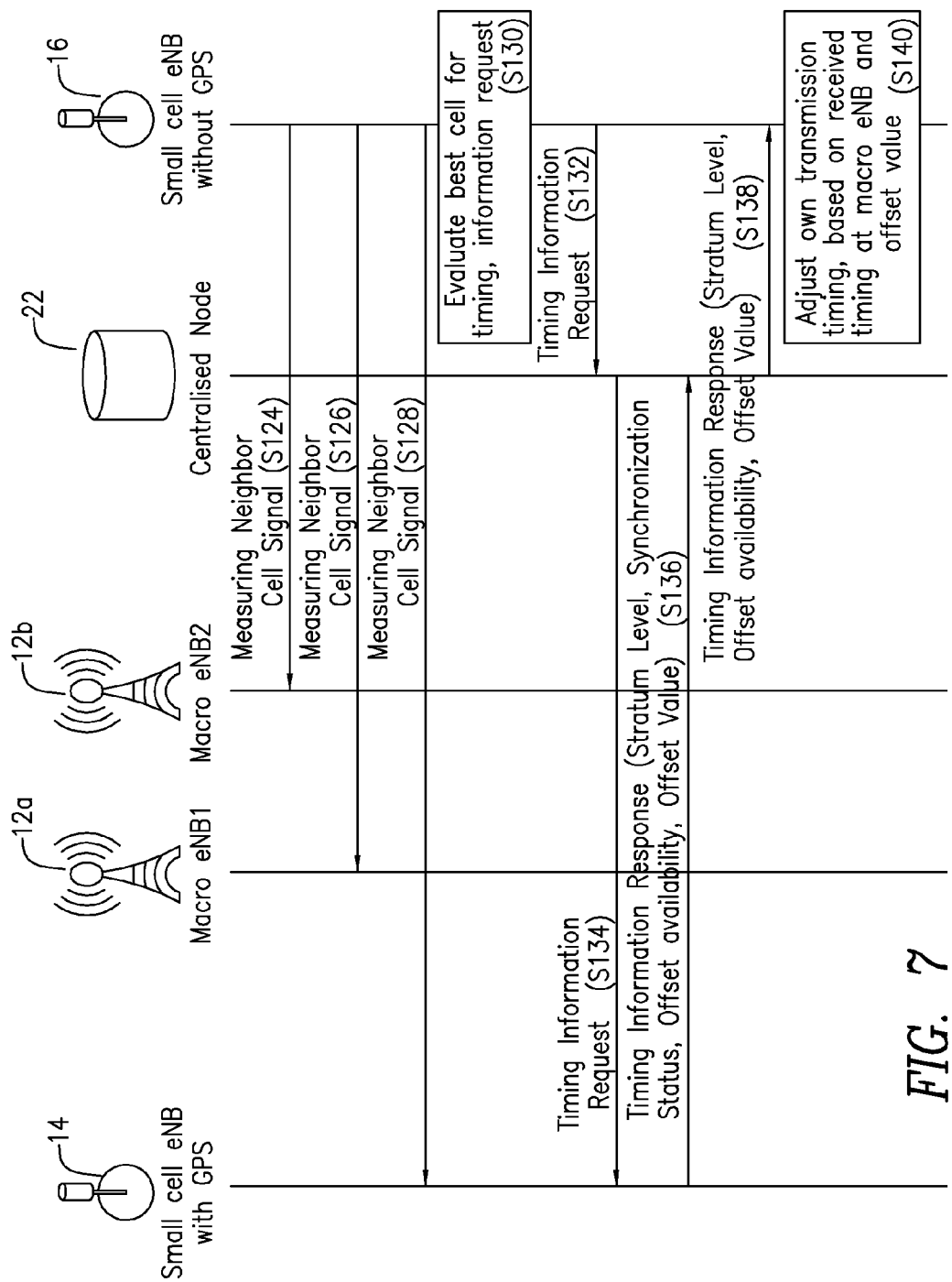
FIG. 7 is a signaling flow diagram for monitoring macro cells and small cells with GNSS by a small cell without GNSS in accordance with the principles of the present disclosure.

When a small cell node 16 that has not received any offset information needs to obtain synchronization, it first listens to the neighboring cells and determines which cells are candidates for use to obtain eNB synchronization, as illustrated in the signaling flow diagram of FIG. 7 (blocks S124-S130). The small cell node 16 then sends a request to the best candidate asking for synchronization status and offset information (blocks S132-S134). The small cell node 16 may decide to prioritize candidate eNBs based on criteria other than received signal level.

For example, when the small cell node 16 can distinguish macro cell nodes 12 from small cell nodes 14, 16, as is the case when the macro and small cell layers are on separate frequencies, a macro cell node 12 may be prioritized. The candidate cell node 12, 14 then responds with the information including whether a valid offset with respect to the GNSS reference is available (S136-S138). Thus, the two elements, i.e., offset availability and offset value, are added to the stratum level and synchronization status information already present in the HeNB specifications, as follows:

1) Offset availability: This is a single bit flag that lets the enquiring eNB know whether an offset with respect to GNSS reference is known.
2) Offset value: This field lets the enquiring eNB know the time offset between its transmit frame timing and the common GNSS reference.

The candidate small cell node 14 responds with the values for the information elements depending on its status. The possible responses for the candidate small cell node 14 are shown in Table 1. The values "STRATUM LEVEL", "OFFSET_VALUE" and "RADIO_FRAME_NUMBER" refer to the appropriate values that correspond to the particular candidate eNB. Note that the RADIO_FRAME_NUMBER may or may not be sent, i.e., it is optional.

TABLE 1

| Candidate eNB status/ Information elements | Stratum | Synchronization status | Offset availability | Offset value | Radio Frame Number |
|---|---|---|---|---|---|
| Synchronized | STRATUM_LEVEL | Yes | Yes | 0 | RADIO_FRAME_NUMBER |
| Not synchronized, offset known | STRATUM_LEVEL | No | Yes | OFFSET_VALUE | |
| Not synchronized, offset unknown | 0 | No | No | 0 | |

If the candidate small cell node 14 is synchronized or if it is not synchronized but signals a known offset, then the inquiring small cell node 16 can use the information to align its transmit timing and achieve synchronized status (block S140). If the candidate macro cell node 12 responds that it is not synchronized and its offset with the GNSS reference is unknown, then the inquiring small cell node 16 sends a request to the next best candidate in its list.

An example of the scenario depicted in FIG. 7 may include an MME 6 as the Centralized Node 22 using S1 based signaling. The existing eNB CONFIGURATION TRANSFER procedure from eNB to MME and the MME CONFIGURATION TRANSFER procedure from MME to eNB can be reused to convey the request from small cell node 16 to small cell node 14 with GPS and to convey the response carrying the timing information from small cell node 14 with GPS to small cell node 16.

In the Timing Information Request message (block S132) from small cell node 16 to the MME 22, as implemented using the eNB CONFIGURATION TRANSFER message, and in the Timing Information Request message (block S134) from the MME 22 to the small cell node 14 with GPS, as implemented using the eNB CONFIGURATION TRANSFER message, the SON Configuration Transfer IE, which is transparently transmitted via the core network, can be reused to carry the request information. Within this IE, the SON Information IE as defined in Technical Specification (TS) 36.413v11.5.0 can be enhanced as shown in Table 2 below.

TABLE 2

| IE/Group Name | IE type and reference |
|---|---|
| CHOICE SON Information | |
| >SON Information Request | |
| >>SON Information Request | ENUMERATED(X2 TNL Configuration Info, . . . , Time synchronization Info, Enhanced Time Synchronization Info) |
| >SON Information Reply | |
| >>SON Information Reply | |

In the example in Table 2, a new value for the SON Information Request, namely the Enhanced Time Synchronization Information, has been added. This new value denotes the request for timing information described herein. Alternatively, the same Enhanced Time Synchronization Info can be reused, where the node receiving such request may provide an enhanced set of timing information, if supported.

In the Timing Information Response message (block S136) from small cell node 14 to the MME 22, implemented using the eNB CONFIGURATION TRANSFER message, and in the Timing Information Response message (block S138) from the MME 22 to the small cell node 14, implemented using the eNB CONFIGURATION TRANSFER message, the SON Configuration Transfer 1E, which is transparently transmitted via the core network, can be reused to carry the timing information as shown in the enhanced Time Synchronization Info IE below in Table 3.

TABLE 3

| IE/Group Name | IE type and reference |
|---|---|
| Synchronization Info | |
| >Stratum Level | INTEGER (0 . . . 3, . . . ) |
| >Synchronization status | ENUMERATED(Synchronous, Asynchronous, . . . ) |
| >Offset Value | INTEGER (−100 . . . 100) |
| >Offset Availability | ENUMERATED(Available, not available, . . . ) |
| >Radio Frame Number | INTEGER (0 . . . 9) |

After a few iterations of the messaging protocol described above, all of the small cell nodes 16 that have some direct or indirect connection to a reference small cell node 14 can achieve synchronization. More specifically, the set of small cell nodes 16 can be represented by a graph where the vertices are the small cell nodes 16 and two small cell nodes 16 are connected if they are able to receive signals from each other (reciprocity assumed) at levels above a given threshold. In such a graph, the protocol described above can help achieve synchronization for any small cell node 16 that is connected to a reference small cell node 14 or stratum 0 cell node that is synchronized. However, nodes or sets of nodes that are disconnected in this graph from any reference small cell nodes will not achieve synchronization. Synchronization for such small cell nodes is described below.

A Fourth Embodiment

Figure 8:
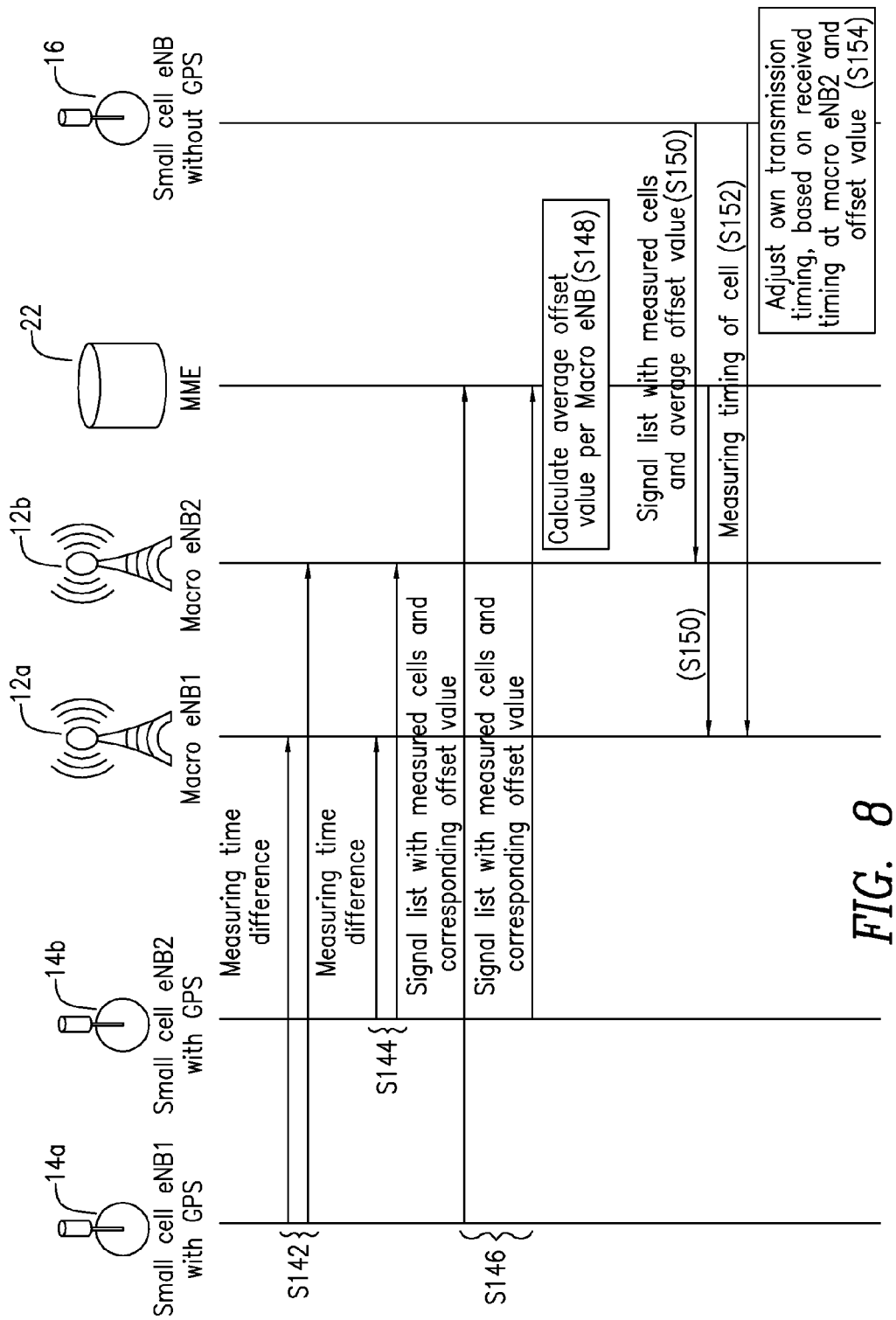
FIG. 8 is a signaling flow diagram of an embodiment where timing measurements from a plurality of GNSS-equipped small cell nodes are averaged in accordance with the principles of the present disclosure.

Referring to FIG. 8, in some embodiments, the reference small cell node 14 sends the measured offset information not just to the cell nodes for which measurements were made (blocks S142, S144), but to all cell nodes. This is done by sending the measurements to a network node such as the MME 22, for example, on the S1 interface (block S146). The network node 22 gathers the offset information from all of the reference small cell nodes 14. When offset information is received from multiple reference small cell nodes and regarding multiple detected cells, the information (timing offset) is averaged for each cell measured by the reference small cell nodes to generate a mean offset value per cell (block S148). Such averaging may be done in the network node 22 instead of being done in the candidate macro cell nodes 12.

The network node 22 then sends offset information for all cells reported by the reference small cell nodes 14 to all cell nodes (block S150). This message contains information shown in Table 4, and is reported for each cell listed in the message, and for each cell node for which information is sent. Each row in Table 4 represents a valid combination of the information elements that can be sent for a cell, where E-CGI refers to the Enhanced Cell Global Identity. The RADIO_FRAME_NUMBER value may or may not be present.

The message may contain information for a cluster or a set of clusters in a particular area. Clusters that have significant separation in received signal levels or geographic distance may receive a separate message containing offset information for that cluster. The decision as to how to group cell nodes that receive a common message is decided by the network node or by previous configuration, e.g., via operation, administration and maintenance (OAM). The small cell node 16 measures timing of a macro cell (block S152), which is now synchronized via the average offset from the centralized node 22, and adjusts the small cell node 16's own timing based on the measured time of the macro cell (block S154).

that has been received for one of the macro cell nodes 12 of interest without needing to engage in any further communication with the network node 22 or with other cell nodes 12, 14 since the relevant offset information is already available. Offset information may once again be requested after a certain period since the offsets may not be valid due to the different rates of drift of the clocks at each cell node.

A Sixth Embodiment

Figure 10:
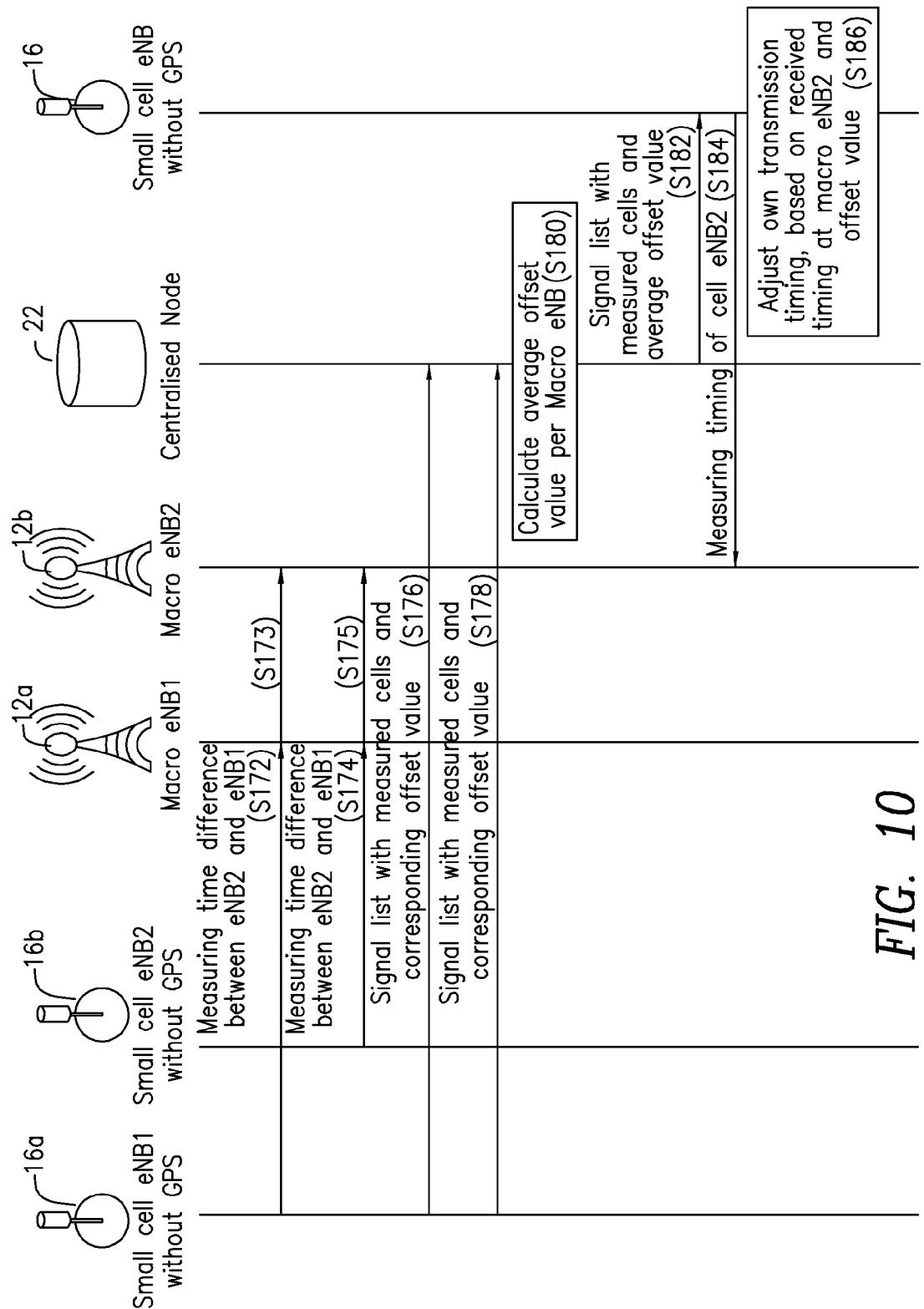
FIG. 10 is a signaling flow diagram of an embodiment for synchronizing a cluster of small cell nodes and macro cell nodes when no small cell node in the cluster has GNSS, in accordance with the principles of the present disclosure.

In the above-described embodiments, at least one small cell has a GNSS reference available. In some embodiments, no small cell in a cluster of small cells has a GNSS reference. An example of this is shown in FIG. 10, where the small cell nodes 16a, 16b and 16c, referred to collectively herein as small cell nodes 16, do not have GNSS capabilities. In these embodiments, the variable for the GNSS reference time is set to be the same as the reception time for one of the macro cell nodes 12, as measured by the small cell nodes 16a and 16b. That is, $t_1^g = t_R$, or equivalently, $\delta_1 = 0$. This effectively lets the first macro cell node 12a assume the

TABLE 4

| Cell ID | Candidate eNB status/ Information elements | Stratum | Synchronization status | Offset availability | Offset value | Radio Frame Number |
|---|---|---|---|---|---|---|
| E-CGI Value | Synchronized | STRATUM_LEVEL | Yes | Yes | 0 | RADIO_FRAME_NUMBER |
| | Not synchronized, offset known | STRATUM_LEVEL | No | Yes | OFFSET_VALUE | |
| | Not synchronized, offset unknown | 0 | No | No | 0 | |

A Fifth Embodiment

Figure 9:
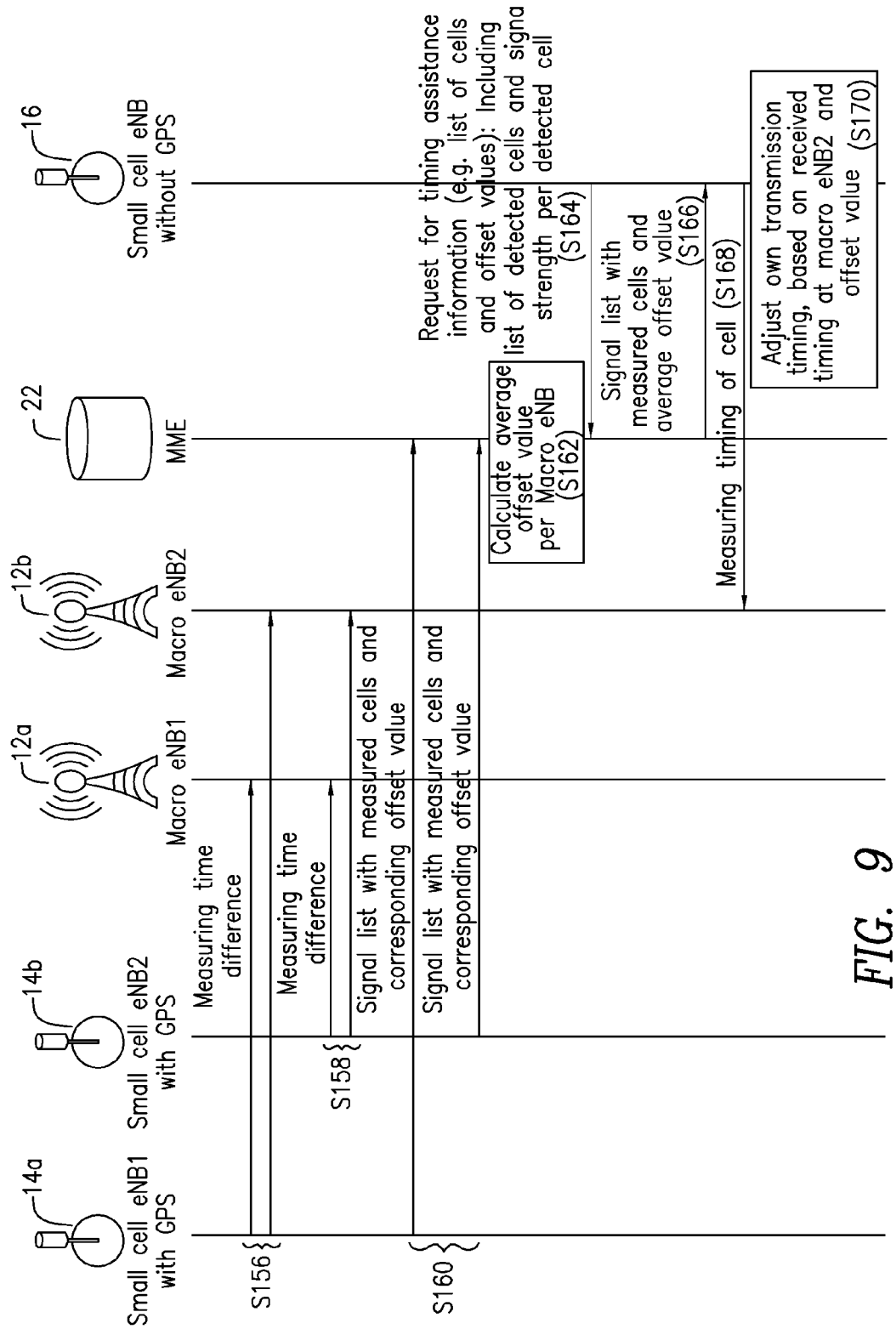
FIG. 9 is an alternative signaling flow diagram where a small cell node without GNSS requests timing information from a central node in accordance with the principles of the present disclosure.

Referring to FIG. 9, time differences between the small cell nodes 14 and the macro cell nodes 12 are determined (block 156, 158). The central node 22 receives from the reference small cell nodes 14 messages including detected cells and timing offsets (block S160) and computes an average offset value that is the average of offset values received from the reporting macro cell nodes 12 (block S162).

In some embodiments, the central node 22 is requested by the small cell nodes 16 to report timing information (S164). This request may also contain a list of cells detected by each of the requesting small cell nodes 16, optionally including signal strength measurements for each cell. However, the central node 22 may apply averaging with respect to the offsets reported by different reference small cell nodes 14 for the same cell.

The central node 22 is aware of the cells detected by the small cell nodes and the central node 22 is aware of the timing offsets, Stratum Level and Synchronization Status and Radio Frame Number of each cell reported by the reference small cell nodes 14. The central node 22 sends a message to each small cell node 16 in the cluster of small cell nodes indicating a single cell or a list of cells in order of priority together with the appropriate information from Table 4 for each cell (S166). A small cell node 16 may measure a timing of one of the macro cell nodes 12 (block S168). The small cell nodes 16 may adjust their own transmission times based on the timing information received from the central node 22 (block S170).

When a small cell node 16 needs to achieve synchronization or make periodic measurements to maintain synchronization, the small cell node 16 uses the offset information role of the GNSS reference, thus rendering its offset compared to an imaginary GNSS reference to be 0.

The offset in timing for all other cell nodes 12, 16 are then compared to this first macro cell node 12a (blocks 172-175). This ensures that all small cell nodes which derive synchronization from a cell node whose time difference with respect to the first reference cell node can be measured by at least one small cell node, are synchronized.

The offset values measured by the small cell nodes 16, and by the macro cell node 12b that is not being used as a reference, are sent to the central node 22 (blocks 176-178). The central node 22 calculates an average offset (block S180). This average offset may be sent to a small cell node 16c, for example (block S182). The small cell node 16c may measure the timing of one of the macro cell nodes 12b (block S184) and adjust its own timing based on the measured timing (block 186).

For cells that are distant from the first reference small cell node, a different small cell node may be chosen as the reference and the same procedures are performed. The case for distributed coordination can similarly be described in terms of previously defined embodiments with the difference that the offset measurements are now between two macro cell nodes rather than between a macro cell node and a GNSS reference.

Thus, the procedure for achieving synchronization can be centralized via a centralized node 22 that could be, for example, an MME, the OAM, an eNB or a dedicated node. Or, the procedure could be decentralized, where information could be exchanged between eNBs either via a proxy node or via a direct interface such as the X2 interface.

A Seventh Embodiment

Figure 11:
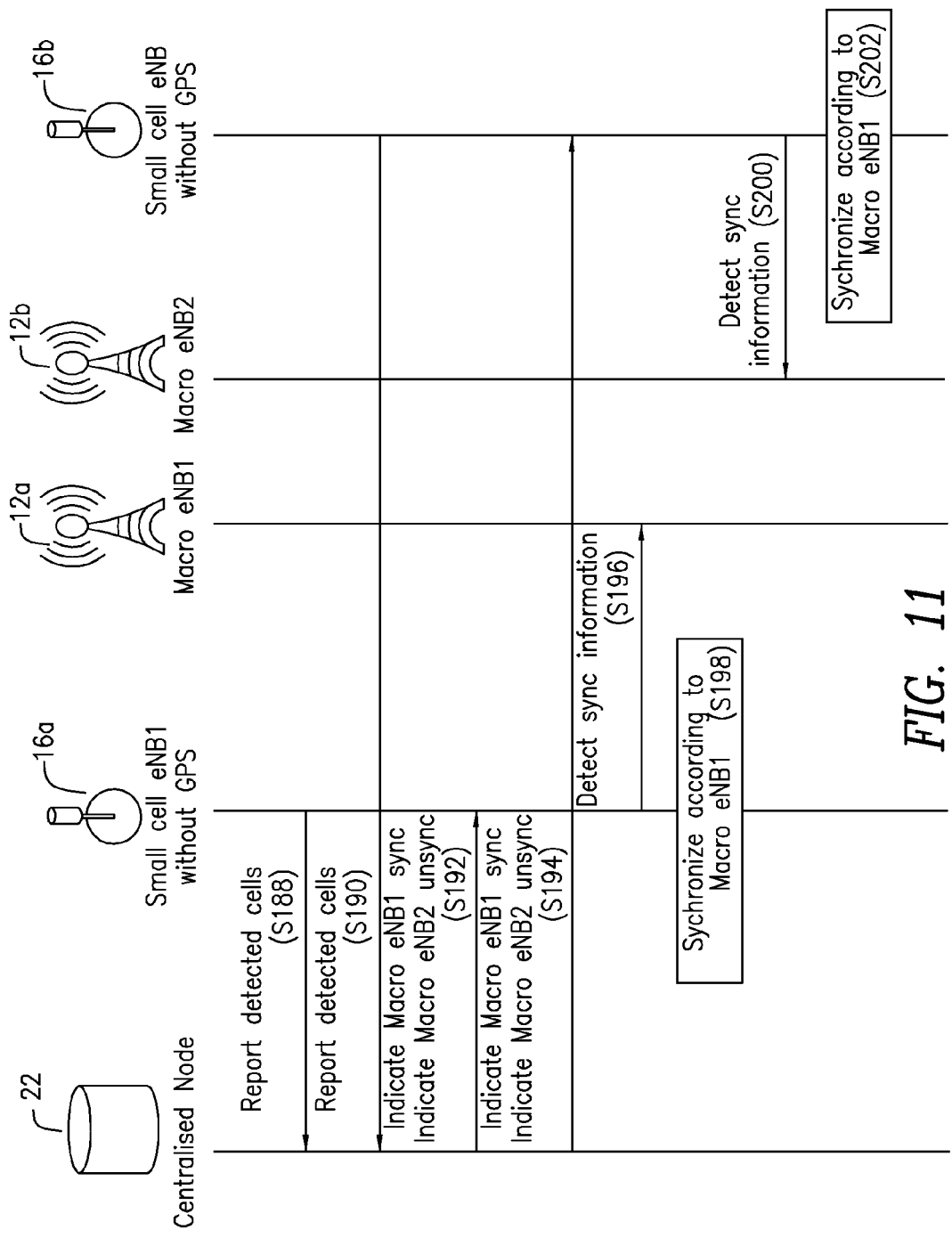
FIG. 11 is a signaling flow diagram of an embodiment where each small cell node report to a central node in accordance with the principles of the present disclosure.

Referring to FIG. 11, in some embodiments, each small cell node 16 reports to the central node 22 the macro cell nodes 12 that the small cell nodes 16 detects (blocks S188, S190). In response, the central node 22 indicates to the small cell nodes 16 the synchronization status of the macro cell nodes 12 (blocks S192, S194). Each small cell node 16 detects synchronization information from respective ones of the macro cell nodes 12 (blocks S196, S200). Each small cell node 16 synchronizes to the respective macro cell nodes 12 (blocks S198, S202).

Note that the signaling between cell nodes consists of the same information elements as used in the existing HeNB specifications, i.e., each small cell signals its synchronization status and what the stratum number is. In these embodiments, additional information elements such as offset information are not included.

For each small cell node 16, a decision is made in a network node regarding which small cell node or macro cell node should be used by the small cell for synchronization. When synchronization information is sent to the small cell node regarding a macro cell node that is not to be used for synchronization, the synchronization status of the macro cell node is indicated as being asynchronous so that the small cell node does not use this cell for synchronization. But, when synchronization information is sent to another small cell node for which the same macro cell node should be used for synchronization, the synchronization status is reported as synchronous.

Small cell node specific adaptation of the synchronization status information can be used to control the cell nodes that are used for synchronization by different clusters. Thus, small cell nodes within a first cluster that are completely within the coverage area of a first macro cell node and that do not cause any interference to, or receive any interference from, other small cell clusters, can be synchronized to the first macro cell node (block S198). Similarly, small cells within a second cluster that do not cause any interference to, or receive any interference from, the first or any other cluster and are within the coverage area of a second macro cell node can be synchronized to the second macro cell node (block S202). The first and second macro cell nodes do not have to be synchronized to each other and neither do non-interfering clusters within the coverage areas of each of the macro cell nodes.

In some embodiments, the small cell node 16 reports to a central node 22 the set of cell IDs corresponding to cells that the small cell node 16 can detect with a received signal to interference plus noise ratio (SINR) value above a given threshold (blocks S188, S190). The threshold may be predetermined or may be sent to the small cell nodes 16 by the network node 22. The small cell nodes 16 for which reports are sent may include both small cells and macro cells. This information is then used by the central node in determining cluster boundaries so that the appropriate synchronization status information can be sent (blocks S192, S194), as described above.

Such information can include at least one of the following components:

1) location of the small cell eNB;
2) set of cell IDs corresponding to the macro and small cells that the small cell eNB can detect; and
3) SINR, reference signal received power (RSRP) and/or reference signal received quality (RSRQ) measurement of the detected cells.

This information is used by the network node to determine which cells should be clustered together and should use a certain eNB for synchronization. The eNB specific synchronization status signaled above is determined based on this clustering operation. When a cluster is found to border the coverage area of two macro cell nodes, the network node chooses one of the macro cell nodes for all the cells in the cluster to synchronize to. Hence, one of the macro cell nodes is reported as being in synchronous state while the other is reported as being in asynchronous state (blocks S192, S194).

In some embodiments, reuse of the existing S1 procedures such as eNB CONFIGURATION TRANSFER and MME CONFIGURATION TRANSFER is possible. Also, information may be carried with a specific interpretation of the Synchronization Status IE. Further, these procedures can be enhanced by adding to the request message from eNB to the centralized node (or to peer eNB), the source cell ID of the cell for which the requesting cell node wants to acquire the timing information.

Also, the source cell ID of the cell from which the timing information is sent may be added to the response message from the centralized node (or from peer eNB). This mechanism is particularly useful, for example, in deployments of HeNBs connected to a HeNB GW, where the eNB ID and tracking area identity (TAI) currently in use for the identification of source and target cells in the SON Information Transfer procedures would not be able to identify a particular HeNB cell.

Figure 12:
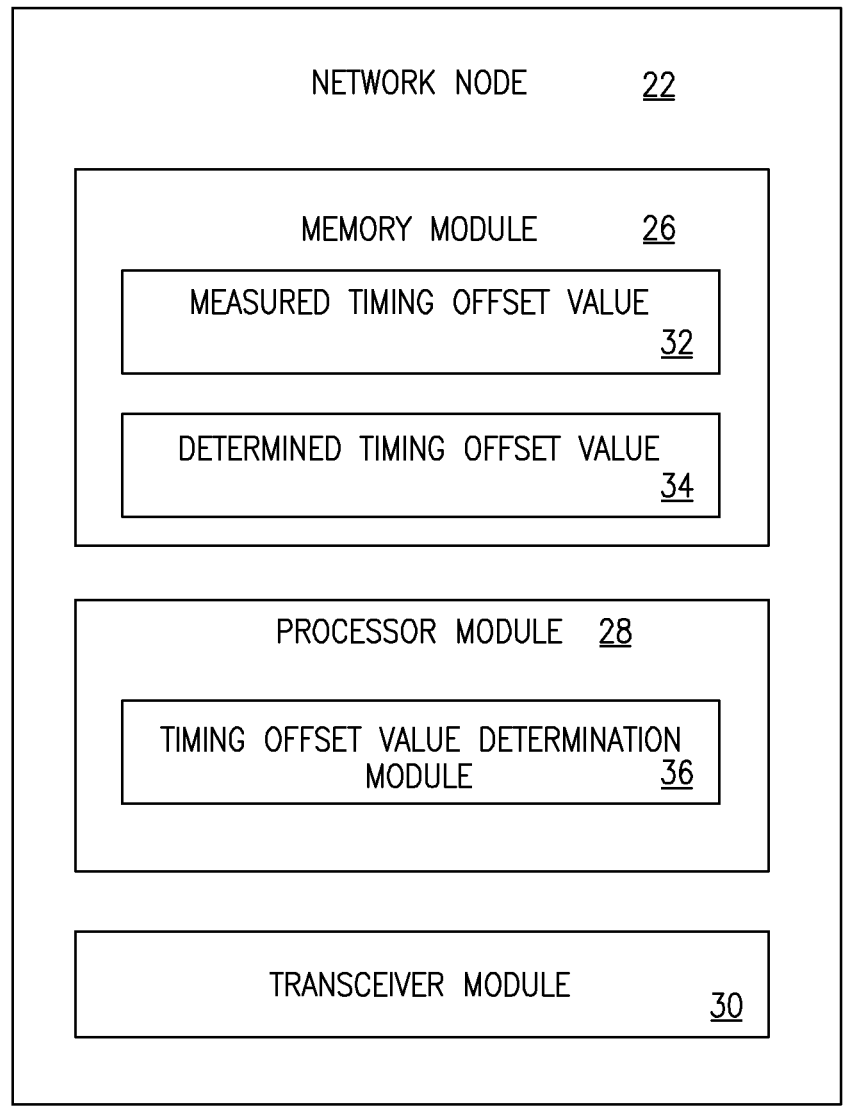
FIG. 12 is a block diagram of an exemplary network node constructed in accordance with the principles of the present disclosure.

FIG. 12 is a block diagram of an exemplary centralized node 22, with coordinating functionality described herein. The centralized node 22 includes a memory module 26, a processor module 28 and a transceiver module 30. The memory module 26 is configured to store one or more measured timing offset values 32 that are measured at the node 22 or at a small cell node 14 or 16. The memory module 26 is also configured to store a determined timing offset value 34 based on the measured timing offset value 32. The processor module 28 includes a timing offset value determination module 36 which determines the timing offset value 34. For example, the timing offset value 34 may be an average of measured timing offset values 32 received from a plurality of small cell nodes 14 or 16. The transceiver module 30 receives measured timing offset values 32 from small cell nodes 14 and/or 16 and transmits determined timing offset values to small cell nodes 16 and macro cell nodes 12. Note that the transceiver module 30 can be an integrated transmitter and receiver or be implemented as separate components, i.e., a separate receiver and a separate transmitter.

Figure 13:
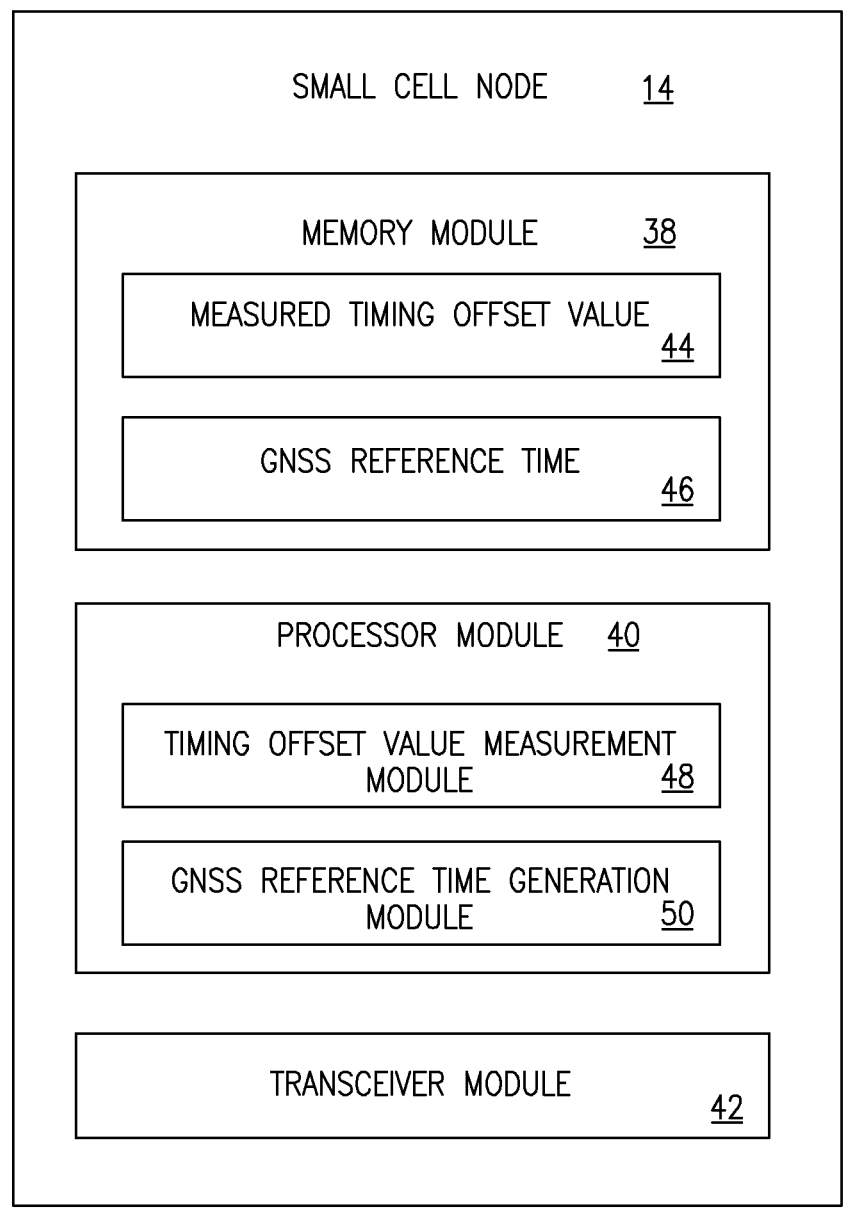
FIG. 13 is a block diagram of an exemplary small cell node constructed in accordance with the principles of the present disclosure.

FIG. 13 is a block diagram of an exemplary small cell node 14, having a memory module 38, a processor module 40 and a transceiver module 42. The memory module 38 is configured to store measured timing offset values 44 and a GNSS reference time 46. The processor module 40 includes a timing offset value measurement module 48 which determines a timing offset value that is a difference between a timing value from a macro cell node 12 and the GNSS reference time 46. The processor module 40 also includes a GNSS reference time generation module 50, which may be implemented via a GPS receiver. The transceiver module 42 is configured to receive the macro cell node timing and to transmit the measured timing offset value 44 to a network node, such as network node 22 or a macro cell node 12.

Figure 14:
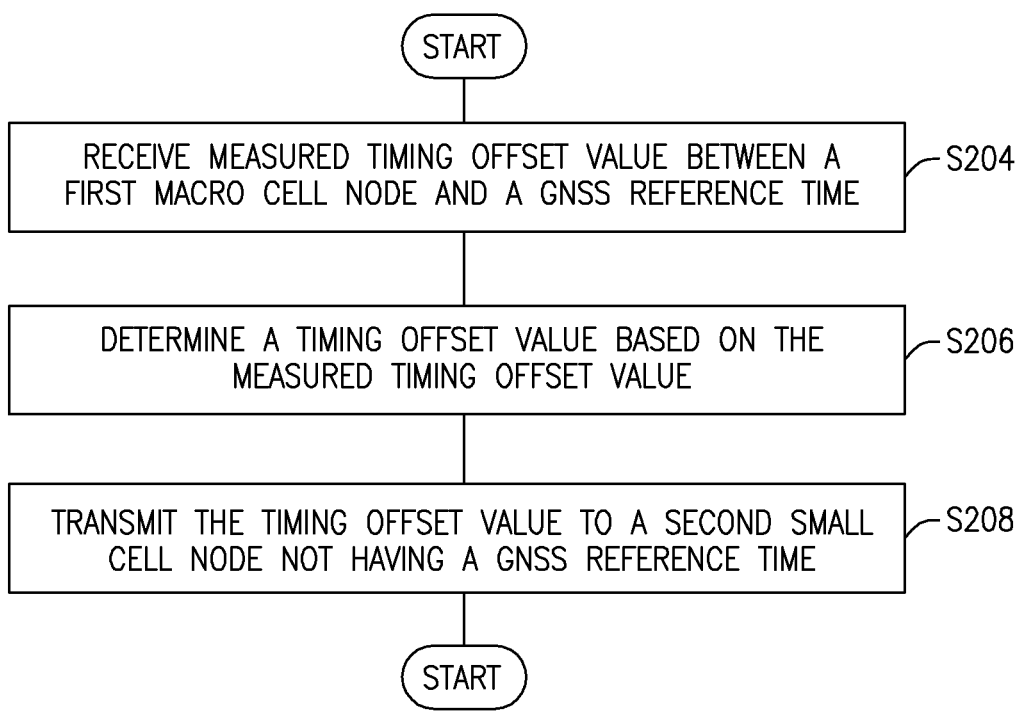
FIG. 14 is a flowchart of an exemplary process for synchronizing a plurality of small cell nodes in accordance with the principles of the present disclosure.

FIG. 14 is a flowchart of an exemplary process for synchronizing a plurality of small cell nodes. A measured timing offset value between a first macro cell node and a GNSS reference time is received (block S204). A timing offset value is determined based on the measured timing offset value (block S206). The determined timing offset value is transmitted to a small cell node not having a GNSS reference time generator (block S208).

Figure 15:
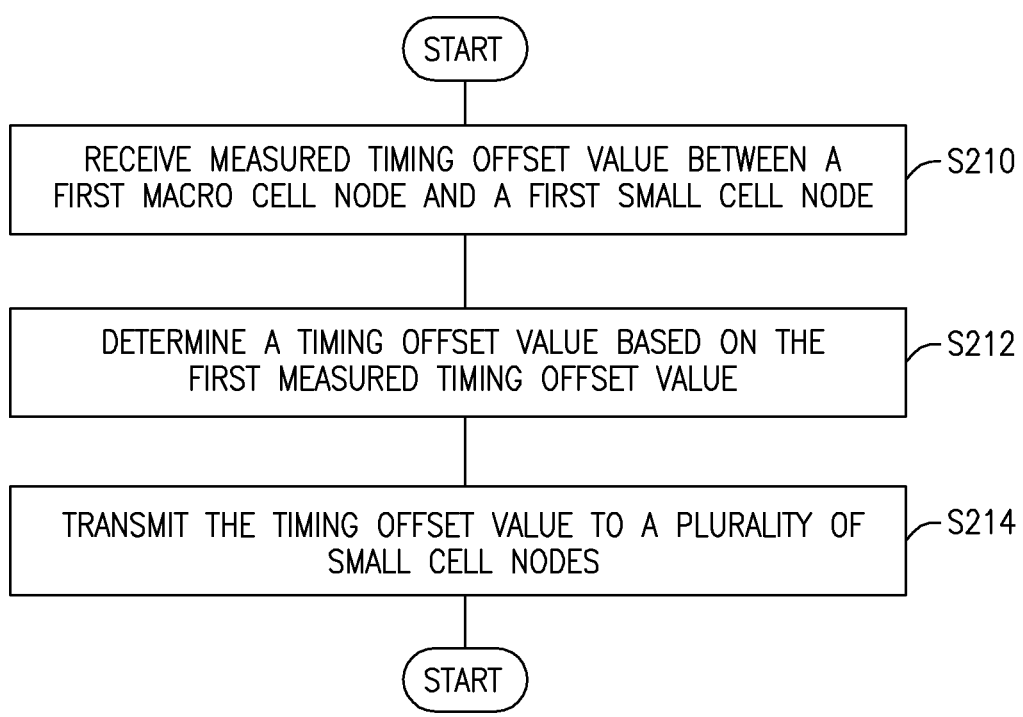
FIG. 15 is a flowchart of an exemplary process of synchronizing a plurality of small cell nodes, when no small cell node has a GNSS reference time generator in accordance with the principles of the present disclosure.

FIG. 15 is a flowchart of an exemplary process of synchronizing a plurality of small cell nodes 15 when no small cell node 16 has a GNSS reference time generator. A measured timing offset value between a first macro cell node and a first small cell node (block S210). A timing offset value is determined based on the measured timing offset value (block S212). The determined timing offset value is transmitted to a plurality of small cell nodes (block S214).

Therefore, some embodiments advantageously provide the ability for operators to synchronize small cell nodes even when the macro cells in the same coverage region are not synchronized. Further, some embodiments advantageously provide the ability for operators to synchronize all small cells to a common reference time when GNSS receivers and coverage are available to at least one small cell node in a cluster. Also, some embodiments advantageously provide the ability for operators to synchronize small cells that interfere with each other to a common reference even when no small cells in the network have GNSS receivers and coverage.

The present disclosure can be realized in hardware, software, or a combination of hardware and software. Any kind of computing system, or other apparatus adapted for carrying out the methods described herein, is suited to perform the functions described herein. A typical combination of hardware and software could be a specialized or general purpose computing system having one or more processing elements and a computer program stored on a storage medium that, when loaded and executed, controls the computing system such that it carries out the methods described herein. The present disclosure can also be embedded in a computer program product, which comprises all the features enabling the implementation of the methods described herein, and which, when loaded in a computing system is able to carry out these methods. Storage medium refers to any volatile or non-volatile storage device.

Computing program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope of the disclosure, which is limited only by the following claims.

What is claimed is:

1. A method of synchronizing a plurality of nodes in a wireless communication system, the method comprising:
    receiving a first measured timing offset value between a first node of a first type and a common global navigation satellite system, GNSS, reference time received from a first node of a second type having the GNSS reference time;
    determining a timing offset value based on the first measured timing offset value; and
    transmitting the determined timing offset value to a second node of the second type that does not have a GNSS reference time so that the second node of the second type is enabled to synchronize to timing of the first node of the first type.

2. The method of claim 1, wherein the first node of the first type is a macro cell node, the first node of the second type is a small cell node having the GNSS reference time, and the second node of the second type is a small cell node not having the GNSS reference time.

3. The method of claim 2, wherein the first timing offset value is relayed from a network node to a plurality of small cell nodes not having a GNSS reference time, so that the plurality of small cell nodes are enabled to synchronize to timing of the first macro cell node.

4. The method of claim 2, further comprising averaging measured timing offset values between the first macro cell node and each of a plurality of small cell nodes to produce the determined timing offset value.

5. The method of claim 2, further comprising receiving from a second small cell node a request for timing assistance information.

6. The method of claim 5, wherein the request for timing assistance information is contained in a self-organizing network, SON, information element.

7. The method of claim 6, further comprising generating a response to the request for timing assistance information and embedding the response in a SON information element.

8. The method of claim 2, further comprising sending a stratum level and synchronization status of other small cell nodes in a cluster containing the first small cell node.

9. The method of claim 2, further comprising measuring a second timing offset between a second macro cell node and the GNSS reference time to enable synchronization of the second macro cell node with the first macro cell node.

10. A method for synchronizing a plurality of nodes of a second type in the absence of the plurality of nodes of the second type having a global navigation satellite system, GNSS, reference, the method comprising:
    receiving from a first node of the second type a first measured timing offset value between a first node of a first type and the first node of the second type;
    determining a timing offset value based on the first measured timing offset value; and
    transmitting the timing offset value to the plurality of nodes of the second type.

11. The method of claim 10, further comprising
    receiving from a second node of the second type a second measured timing offset value between the first node of the first type and the second node of the second type; and
    averaging the first measured timing offset and the second measured timing offset value to determine the transmitted timing offset value.

12. The method of claim 10, wherein the first node and the second node of the second type are small cell nodes and the first node of the first type is a macro cell node.

13. A network node configured to synchronize a plurality of nodes of a second type to the timing of a node of a first type, the network node comprising:
    a memory configured to store:
        a first measured timing offset value between a first node of the first type and a global navigation satellite system, GNSS, reference time received from a first node of the second type having the GNSS reference time; and
        a timing offset value based on the first measured timing offset value; and
    a processor configured to:
        determine the timing offset value;

a transceiver configured to:
receive the first measured timing offset value; and
transmit the determined timing offset value to a second node of the second type lacking a GNSS reference time to enable the second node of the second type to synchronize to the first node of the first type.

14. The network node of claim 13, wherein network node is a node of the second type.

15. The network node of claim 13, wherein the first node of the first type is a macro cell node, the first node of the second type is a small cell node having the GNSS reference time, and the second node of the second type is a small cell node not having the GNSS reference time.

16. The network node of claim 15, wherein:
the transceiver is further configured to:
receive a plurality of measured timing offset values from a plurality of small cell nodes; and
transmit an average of the measured timing offset values; and
the processor is further configured to:
compute the average of the measured timing offset values.

17. A network node configured to synchronize a plurality of nodes of a second type, the plurality of nodes of the second type not having a common global navigation satellite system, GNSS, reference, the network node comprising:
a transceiver configured to:
receive from a first node of the second type a first measured timing offset value between a first node of a first type and the first node of the second type; and
transmit a timing offset value to the plurality of nodes of the second type, the timing offset value being determined based on the first measured timing offset value;
a processor configured to determine the timing offset value; and
a memory configured to store:
the first measured timing offset value; and
the timing offset value.

18. The network node of claim 17, wherein the processor is configured to determine the timing offset value based on a difference between a timing of the first node of the first type and a second node of the first type.

19. The network node of claim 17, wherein the processor is further configured to compute an average of a plurality of received measured time offset values from a plurality of nodes of the second type.

20. The network node of claim 17, wherein the processor is further configured to select at least one of a node of the second type and a node of the first type to include in a group of nodes to synchronize with the first node of the first type.

21. A node of a second type having a global navigation satellite system, GNSS, reference, the node of the second type being in a cluster of nodes of the second type within a coverage area of at least one of a first type, the node of the second type comprising:
a memory configured to store:
a GNSS reference time; and
a measured timing offset value between a timing of a node of the first type and the GNSS reference time;
a processor configured to determine the measured timing offset value; and
a transceiver configured to:
receive the timing from the node of the first type; and
transmit the measured timing offset value to a network node.

22. The node of the second type of claim 21, wherein the transceiver is further configured to transmit an identity of the node of the first type.

23. The node of the second type of claim 21, wherein the transceiver is further configured to transmit the measured timing offset value to another node of the second type.

24. The node of the second type of claim 21, wherein the node of the second type operates at frequencies different from frequencies of operation of the node of the first type.

25. A network node, comprising:
a memory module configured to store:
a measured timing offset value; and
a determined timing offset value;
a processor module including:
a timing offset value determination module configured to determine the determined timing offset value based on the measured timing offset value; and
a transceiver module configured to:
receive the measured timing offset value; and
transmit the determined timing offset value to a plurality of nodes of another type.

26. A node, comprising:
a memory module configured to store:
a measured timing offset value; and
a global navigation satellite system, GNSS, reference time;
a processor module including:
a timing offset value measurement module configured to measure a timing offset value between the GNSS reference time and a time of a node of another type;
a GNSS reference time generator configured to generate the GNSS reference time; and
a transceiver module configured to:
receive the time of the node of the other type; and
transmit the measured timing offset value to a network node.

* * * * *